US007750586B2

(12) United States Patent
Kurosawa et al.

(10) Patent No.: US 7,750,586 B2
(45) Date of Patent: *Jul. 6, 2010

(54) DRIVE CONTROL DEVICE OF MOTOR AND A METHOD OF START-UP

(75) Inventors: Minoru Kurosawa, Takasaki (JP); Yasuhiko Kokami, Takasaki (JP)

(73) Assignee: Renesas Technology Corp., Tokyo (JP)

( * ) Notice: Subject to any disclaimer, the term of this patent is extended or adjusted under 35 U.S.C. 154(b) by 44 days.

This patent is subject to a terminal disclaimer.

(21) Appl. No.: 12/185,496

(22) Filed: Aug. 4, 2008

(65) Prior Publication Data
US 2008/0297082 A1 Dec. 4, 2008

Related U.S. Application Data

(63) Continuation of application No. 11/248,305, filed on Oct. 13, 2005, now Pat. No. 7,411,365.

(30) Foreign Application Priority Data
Oct. 14, 2004 (JP) .............................. 2004-299799

(51) Int. Cl.
*H02P 6/20* (2006.01)
(52) U.S. Cl. .............................. 318/400.32; 318/400.11
(58) Field of Classification Search ................. 318/700, 318/400.01, 400.32, 400.33, 400.34, 400.35, 318/400.36, 400.09, 400.11
See application file for complete search history.

(56) References Cited
U.S. PATENT DOCUMENTS 4,992,710 A * 2/1991 Cassat ................... 318/400.33

| 5,202,616 | A | * | 4/1993 | Peters et al. | ........... 318/400.09 |
|---|---|---|---|---|---|
| 5,739,651 | A | * | 4/1998 | Miyazawa et al. | ..... 318/400.34 |
| 6,340,873 | B2 | | 1/2002 | Seki et al. | |
| 6,433,496 | B1 | * | 8/2002 | Kawagoshi | ............ 318/400.05 |
| 6,441,572 | B2 | | 8/2002 | Batzel | |
| 7,071,640 | B2 | | 7/2006 | Kurosawa et al. | |
| 2004/0080293 | A1 | * | 4/2004 | Kurosawa et al. | ........... 318/459 |

FOREIGN PATENT DOCUMENTS

JP 2001-275387 10/2001
JP 2004-140975 5/2004

* cited by examiner

*Primary Examiner*—Bentsu Ro
(74) *Attorney, Agent, or Firm*—Mattingly & Malur, P.C.

(57) ABSTRACT

A drive control device of motor capable of starting up even a motor of such a type that the polarity of induced voltage does not switch every 180° of electrical angle or the polarity, positive or negative, does not occur with accuracy without causing a reverse rotation is provided. In a start-up control of motor, the following operation is performed: a current is passed through any coils in two phases, and the polarity of voltage induced in the non-conducting phase is detected. A conducting phase at start-up is determined based on the detected polarity of induced voltage. The average value of induced voltages in non-conducting phase detected with respect to the coils in respective phases is determined. The average value and the detected induced voltages are compared with each other, and relative polarities are determined from the magnitude relation with the average value to determine a conducting phase at start-up.

5 Claims, 15 Drawing Sheets

DRIVE CONTROL DEVICE OF MOTOR AND A METHOD OF START-UP

CROSS-REFERENCE TO RELATED APPLICATION

This is a continuation application of U.S. Ser. No. 11/248,305, filed Oct. 13, 2005 now U.S. Pat. No. 7,411,365. The present application claims priority from Japanese patent application No. 2004-299799 filed on Oct. 14, 2004, the content of which is hereby incorporated by reference into this application.

BACKGROUND OF THE INVENTION

The present invention relates to a drive control technology for brushless motors and a technology effectively applicable to start-up control on three-phase direct-current motors. More particularly, it relates to a technology that can be effectively utilized for a drive control device of a spindle motor that rotatably drives storage media in a desk-type storage device, such as a hard disk unit (hard disk driver).

To rotate a magnetic disk as storage media in a hard disk unit, a brushless three-phase direct-current motor designated as spindle motor is in general use. A magnetic disk is rotated at high speed by a spindle motor, and a magnetic head for read/write is brought close to the surface of the rotating magnetic disk and moved in the radial direction to write or read information.

The following method has be conventionally used in drive control on a brushless motor: the positional relation between rotor and stator is detected using a Hall element; a coil phase with which energization should be started is determined from the detected positional relation to prevent the reverse rotation of the motor. However, sensorless motors have been brought into greater use with respect to hard disk units. This is because, when a motor is provided with a rotor position detector using a Hall element, it is difficult to reduce the size of the equipment. Such sensorless motors have a problem. If the positional relation between rotor and stator is unknown when the rotation of a motor is started, the rotor can make a reverse rotation.

To cope with this, the present applicants proposed the following control method: so short a pulse current that a rotor does not react is passed through any coils in two phase; the polarity of an induced voltage that occurs in the non-conducting phase is detected to determine the positional relation between rotor and stator; the characteristic that the polarity of an induced voltage is switched every 180° of electrical angle is utilized to determine a phase with which energization should be started; the reverse rotation of this sensorless motor at start-up is thereby avoided. (Refer to Patent Document 1.)

[Patent Document 1] Japanese Unexamined Patent Publication No. 2001-275387

[Patent Document 2] Japanese Unexamined Patent Publication No. 2004-140975

SUMMARY OF THE INVENTION

Recently, various polyphase direct-current motors have been placed on the market. In these polyphase direct-current motors, the methods of rotor magnet magnetization, the shapes of cores, and the like are varied in order to suppress vibration, noise, and uneven rotation through structural devices. The present inventors applied the start-up control method disclosed in Patent Document 1 to several polyphase direct-current motors recently put on the market. This method is such that an energization start phase is determined from the polarity of an induced voltage occurring in a non-conducting phase. As a result, the present inventors found that motors might make a reverse rotation, and investigated in an attempt to track down the cause.

The result of the investigation revealed the following: as illustrated in FIGS. 22B to 22D in Japanese Unexamined Patent Publication No. 2004-140975, a number of motors changed the polarity of an induced voltage every 180° of electrical angle. As illustrated in FIGS. 22E to 22G, however, some motors temporarily inverted the polarity of an induced voltage in proximity to a zero cross point of back electromotive force. Application of the start-up control method disclosed in Patent Document 1 to a motor could cause a reverse rotation. Consequently, the present inventors made an invention related to a method of start-up and filed an application for this invention (Patent Document 2). With this method, even a motor of such a type that the polarity of an induced voltage is temporarily inverted in proximity to a zero cross point of back electromotive force can be started up without causing a reverse rotation.

However, the following fact thereafter came out: various types of motors had been placed on the market in addition to such motors that the polarity of an induced voltage is temporarily inverted in proximity to a zero cross point of back electromotive force. Such motors include: motors of such a type that the polarity of an induced voltage does not switch every 180° of electrical angle; and motors of such a type that the magnitude of an induced voltage is small and its polarity, positive or negative, does not occur with accuracy.

An object of the present invention is to provide a rotary drive control device that is capable of starting a brushless polyphase direct-current motor without causing a reverse rotation even if the motor is of such a type that the polarity of an induced voltage does not switch every 180° of electrical angle or the polarity, positive or negative, does not occur with accuracy.

The above and other objects and features of the present invention will be apparent from the description of this specification and the accompanying drawings.

The following is a brief description of the gist of the representative elements of the invention laid open in this application.

That is, in start-up control on a motor, a current is passed through any coils in two phases; the polarity of a voltage induced in the non-conducting phase is detected; and a conducting phase at start-up is determined based on the detected polarity of induced voltage. This start-up control is so constructed that the induced voltages of non-conducting phases detected with respect to coils in various phases are averaged; the detected induced voltages are compared with the average value; and the relative polarity of each induced voltage is determined based on its magnitude relation with the average value to determine a conducting phase at start-up.

All the curves obtained by plotting the induced voltages of coils in respective phases cross a line indicating the average value of the induced voltages of the coils in all the phases without exception. Therefore, the following advantage is brought by comparing the average value of the induced voltages of coils in respective phases with detected induced voltages, and thereby identifying relative polarities to determine a conducting phase at start-up, as by the above-mentioned means: even a motor of such a peculiar type that the polarity of an induced voltage does not switch every 180° of electrical angle or the polarity, positive or negative, does not occur with accuracy can be reliably started up without causing a reverse rotation.

The following is a brief description of the gist of effects obtained by the representative elements of the invention laid open in this application.

According to the present invention, even a brushless polyphase direct-current motor of such a peculiar type that the polarity of an induced voltage does not switch every 180° of electrical angle or the polarity, positive or negative, does not occur with accuracy can be reliably started without causing a reverse rotation.

DETAILED DESCRIPTION OF THE PREFERRED EMBODIMENTS

Hereafter, description will be given to preferred embodiments of the present invention with reference to the drawings.

Figure 1:
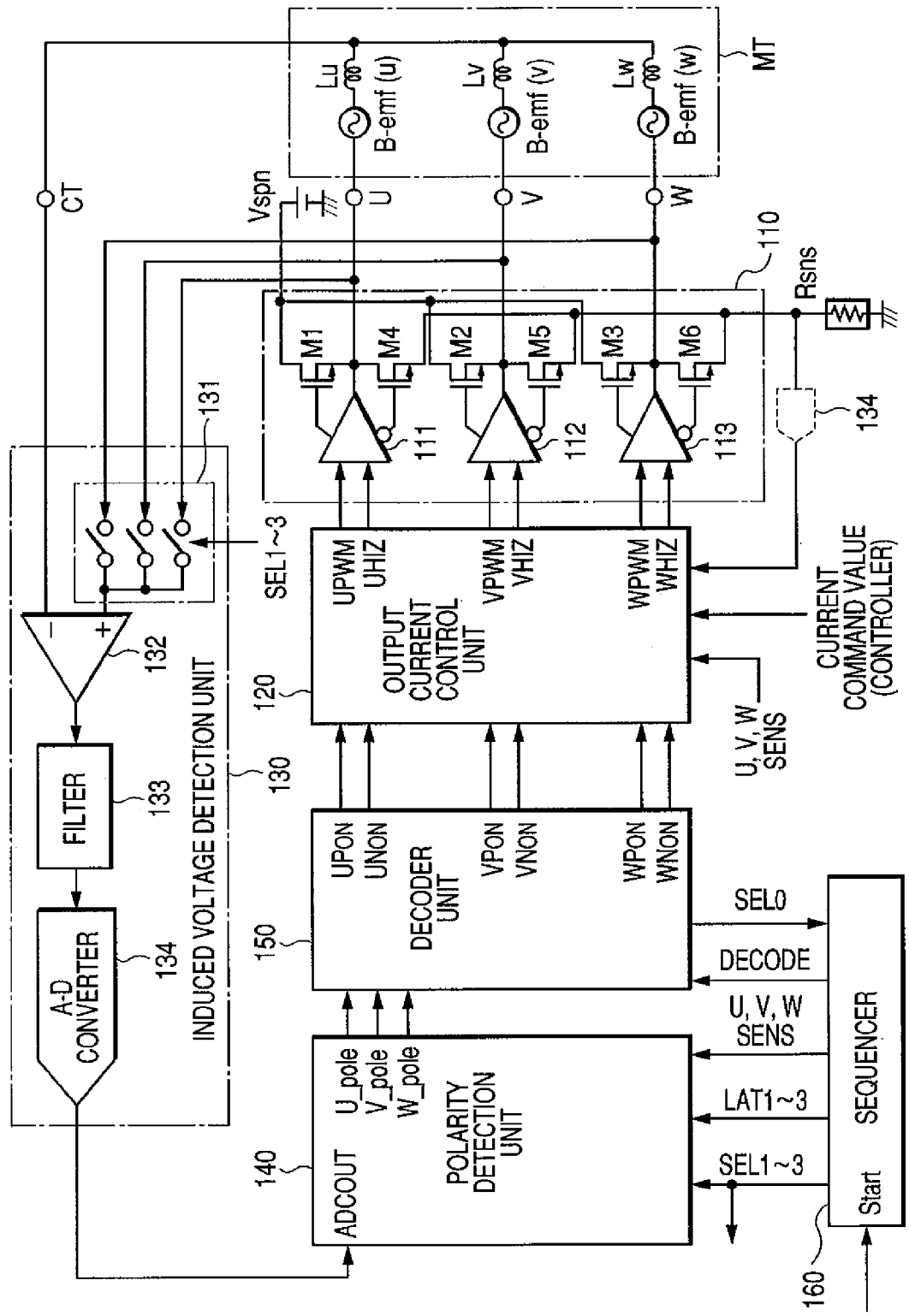
FIG. 1 is a circuitry diagram illustrating the general configuration of the drive control circuit in a three-phase direct-current motor to which the present invention is effectively applicable.

FIG. 1 illustrates the general configuration of the drive control circuit in a three-phase brushless direct-current motor.

In FIG. 1, reference marks Lu, Lv, and Lw denote the stator coils in three phases, phase U, phase V, and phase W, respectively, of a motor MT; and reference marks B-emf(U), B-emf(V), and B-emf(W) denote the back electromotive forces of the coils Lu, Lv, and Lw in the respective phases as voltage sources. Numeral 110 denotes an output driver circuit for applying voltage to the terminal of each coil and passing a driving current through it. Reference marks M1 to M3 denote high potential-side output transistors that cause a current to flow into the coils in respective phases. Reference marks M4 to M6 denote low potential-side output transistors that pull a current from the coils in respective phases. Numerals 111 to 113 denote pre-drivers that apply gate voltage to the output transistors M1 to M6 to control driving currents for the coils. The source terminals of the above low potential-side output transistors M4 to M6 are connected in common and connected to a ground potential point through a current sense resistor Rsns. The drive control circuit is so constructed that a direct current flowing from a power source to a ground point through the motor coils is caused to flow to the sense resistor Rsns.

Numeral 120 denotes an output current control unit that generates PWM signals for controlling output currents and supplies them to the output driver circuit 110. A voltage corresponding to a direct current detected by the current sense resistor Rsns is fed back to this output current control unit 120. The output current control unit generates and outputs pulse signals UPWM, VPWM, and WPWM for PWM control on the output driver circuit 110 so that the detected output current agrees with a current command value supplied from a controller, not shown.

Numeral 130 denotes an induced voltage detection unit that detects an induced voltage induced in the coil in a non-conducting phase in correspondence with the currents passed through any coils in two phases. This induced voltage detection unit 130 comprises: a selection circuit 131 comprised of three switches for selecting a coil whose induced voltage is to be detected; a differential amplifier 132 that amplifies the potential difference between one terminal voltage of the coil selected by the selection circuit 131 and the voltage at a center tap CT to which one ends of the coils are connected in common and outputs it; a filter 133 that cuts noise contained in the output of the differential amplifier 132; and an A-D converter circuit 134 that converts the output voltage of the differential amplifier 132 into a digital signal by A-to-D conversion.

Numeral 140 denotes a polarity detection unit. The polarity detection unit determines the polarity of an induced voltage detected by the induced voltage detection unit 130. In addition, it determines the average value of the induced voltages in non-conducting phase detected with respect to the coils in respective phases. Then the polarity detection unit compares the average value with a detected induced voltage and determines a relative polarity based on the magnitude relation with the average value. Numeral 150 denotes a decoder unit that decodes the output of the polarity detection unit 140 to determine a phase in which a current is to be passed and supplies the output current control unit 120 with a signal indicating the conducting phase. Numeral 160 denotes a sequencer that controls the entire drive control circuit in FIG. 1 in accordance with a predetermined control procedure in response to an input command. The sequencer 160 is supplied with signals indicating a determined conducting phase from the decoder unit 150, and generates and outputs signals for controlling each part according to these signals.

Description will be given to how a conducting phase at start-up of a motor is determined in a drive control circuit in this embodiment.

Figure 2A:
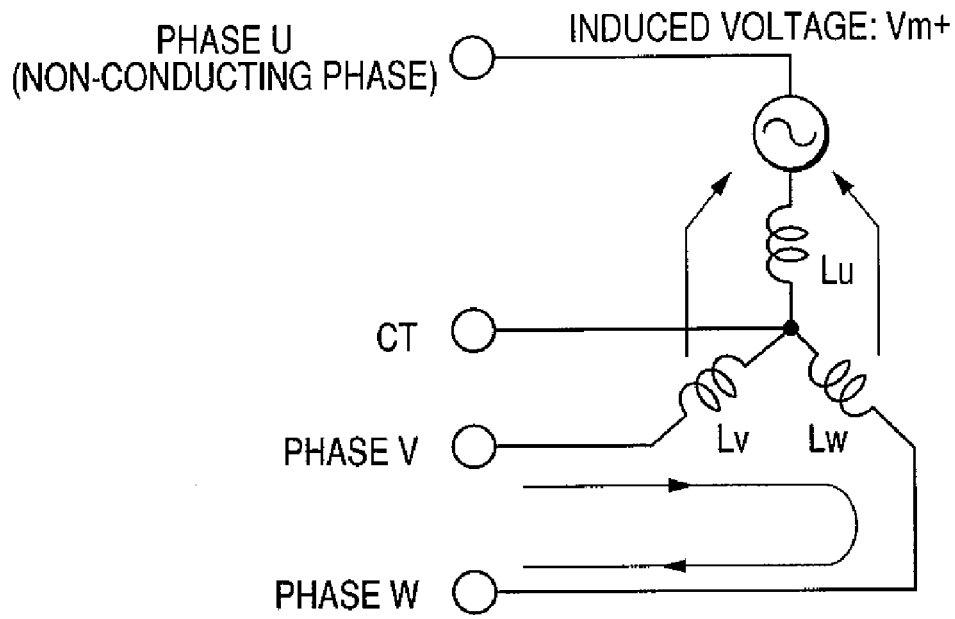
FIGS. 2A and 2B are explanatory drawings illustrating an energizing method for detecting the position of a rotor in a drive control circuit in an embodiment and a detecting method for the induced voltage in a non-conducting phase.
Figure 2B:
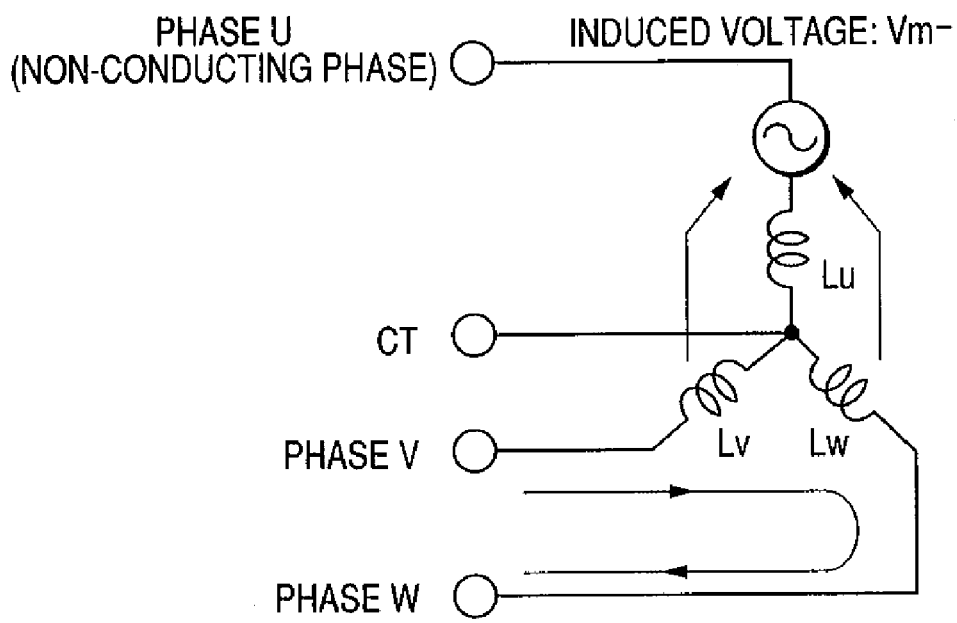

In this embodiment, for example, the following operation is performed: as illustrated in FIG. 2A, so minute an electric current that a rotor does not react is caused to flow from a phase V coil Lv to a phase W coil Lw. The induced voltage Vm+ induced in a phase U coil Lu at this time is detected. As illustrated in FIG. 2B, subsequently, a current is caused to flow from the phase W coil Lw to the phase V coil Lv. The induced voltage Vm− induced in the coil Lu in phase U, the non-conducting phase, at this time is detected. The sum of the induced voltages is worked out, and the obtained value is stored in a register or the like.

Next, a current is caused to flow from the phase U coil Lu to the phase V coil Lv, and the induced voltage Vm+ induced in the phase W coil Lw at this time is detected. Subsequently, a current is caused to flow from the phase V coil Lv to the phase U coil Lu, and the induced voltage Vm− induced in the phase W coil Lw at this time is detected. The sum of the induced voltages is worked out, and the obtained value is stored in a register or the like. Further, a current is caused to flow from the phase W coil Lw to the phase U coil Lu, and the induced voltage Vm+ induced in the phase V coil Lv at this time is detected. Subsequently, a current is caused to flow from the phase U coil Lu to the phase W coil Lw, and the induced voltage Vm− induced in the phase V coil Lv is detected. The sum of the induced voltages is worked out, and the obtained value is added to the already detected detection values associated with the phase U coil Lu and the phase W coil Lw to determine a value equivalent to the average value. (This value is a value three times the average value in this embodiment.) Thereafter, this value equivalent to the average value is compared with the detected induced voltages in respective phases. (The detected induced voltages take values obtained by tripling the detection values in this embodiment.) Thus, relative polarities are identified, and a conducting phase at start-up is determined.

Figure 3:
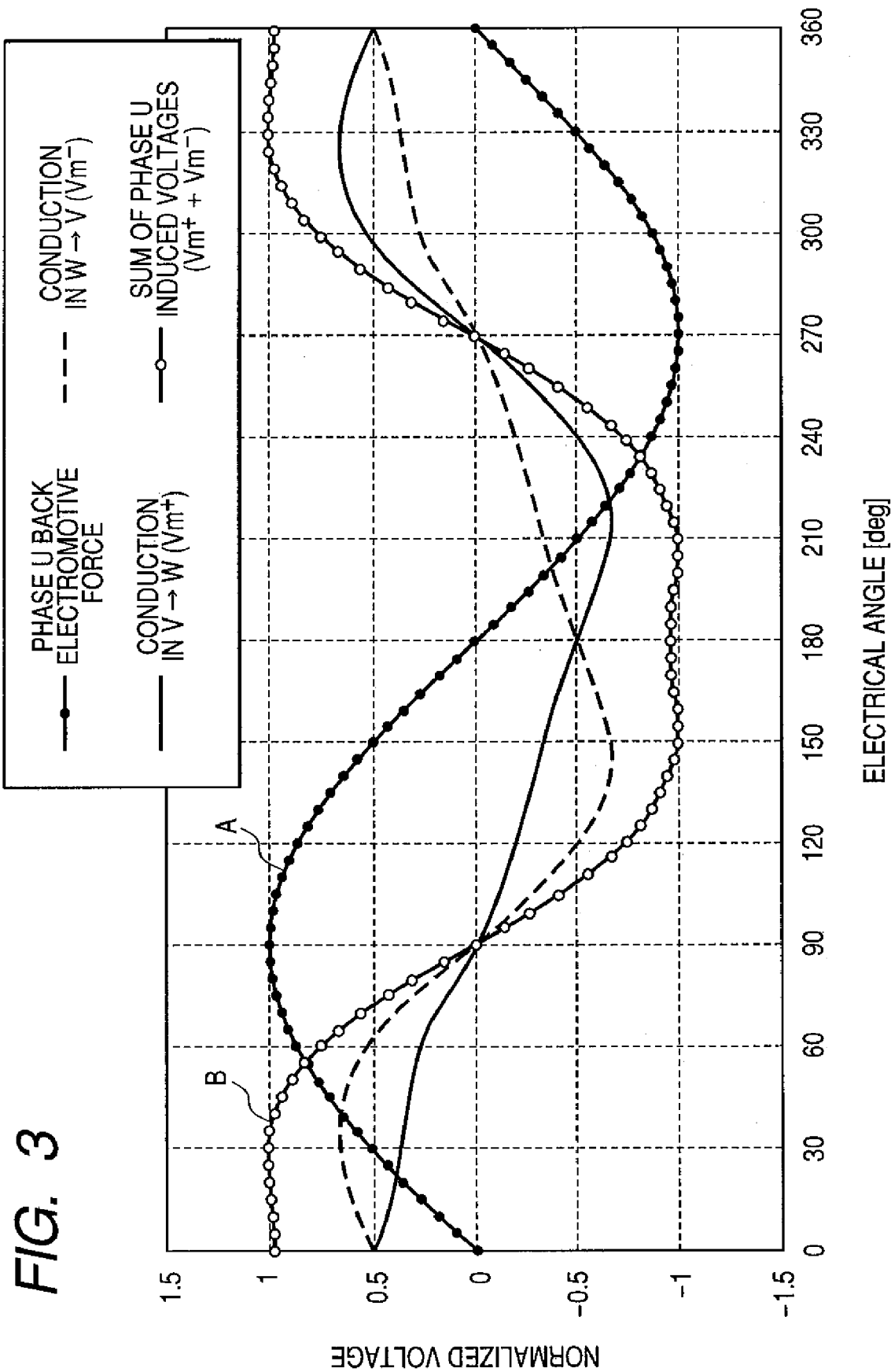
FIG. 3 is a waveform chart illustrating the phase relation between voltages induced in a non-conducting phase and back electromotive forces in a commonly used three-phase direct-current motor.
Figure 4:
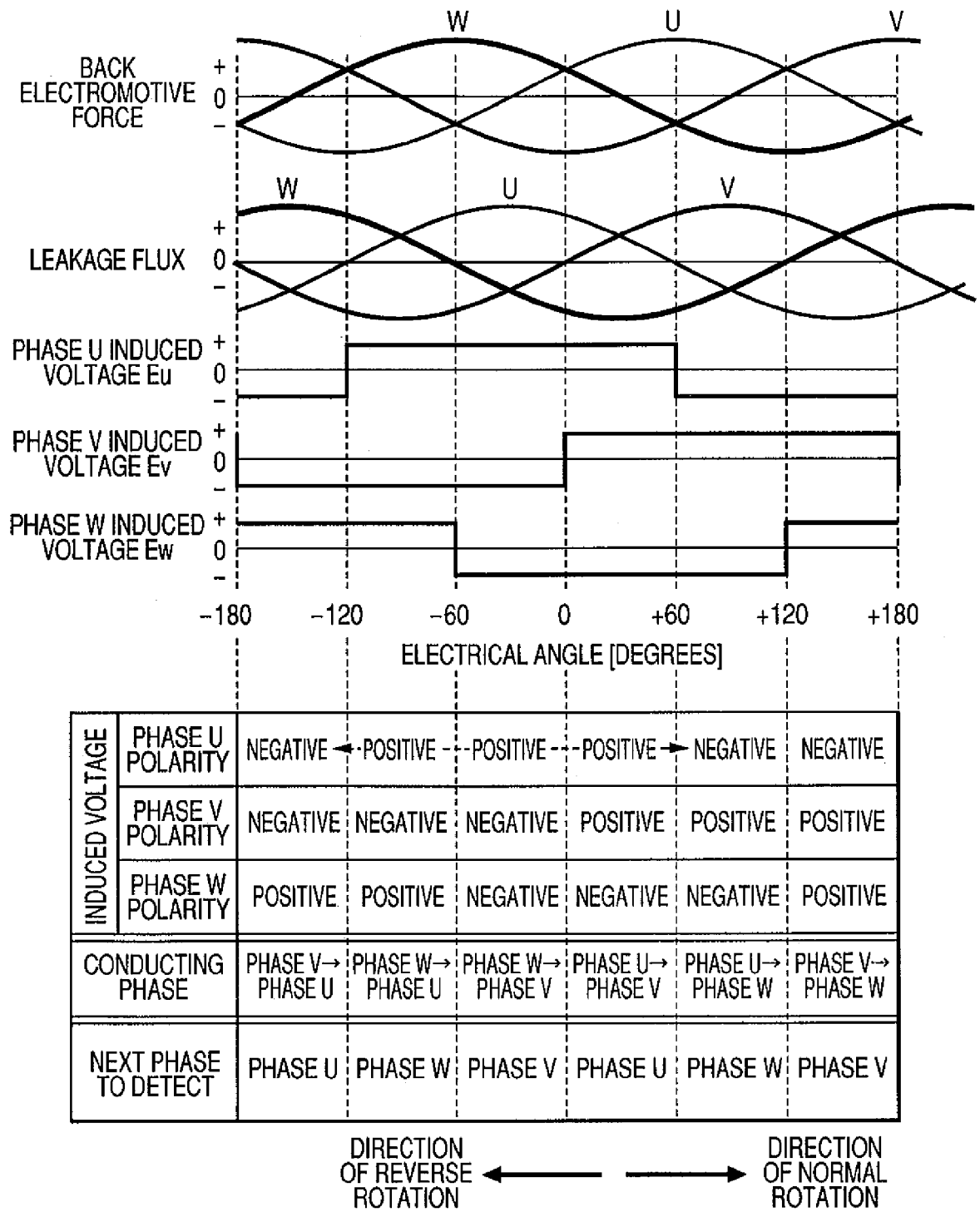
FIG. 4 is a waveform chart illustrating the phase relation between the polarities of induced voltages and back electromotive forces in a commonly used three-phase direct-current motor.

As illustrated in FIG. 3, the waveform B of the non-conducting phase induced voltage of a common three-phase direct-current motor presently on the market is advance in phase from the waveform A of back electromotive force by approximately 90° of electrical angle. To start up a motor whose induced voltage has such characteristics as illustrated in FIG. 3, such a procedure as illustrated in FIG. 4 is taken. The polarities of induced voltages in respective phases are detected. When the polarities of induced voltages in phases U, V, and W are "negative," "negative," and "positive," the conducting phase is determined as phase V→phase U. When the polarities of induced voltages in phases U, V, and W are "positive," "negative," and "positive," the conducting phase is determined as phase W→phase U. When the polarities of induced voltages in phases U, V, and W are "positive," "negative," and "negative," the conducting phase is determined as phase W→phase V. When the polarities of induced voltages in phases U, V, and W are "positive," "positive," and "negative," the conducting phase is determined as phase U→phase V. When the polarities of induced voltages in phases U, V, and W are "negative," "positive," and "negative," the conducting phase is determined as phase U→phase W. When the polarities of induced voltages in phases U, V, and W are "negative," "positive," and "positive," the conducting phase is determined as phase V→phase W. The motor can be started up by controlling the output driver circuit so as to pass a current in accordance with this determination. This method of start-up is the method of start-up disclosed in Japanese Unexamined Patent Publication No. 2001-275387.

Figure 5:
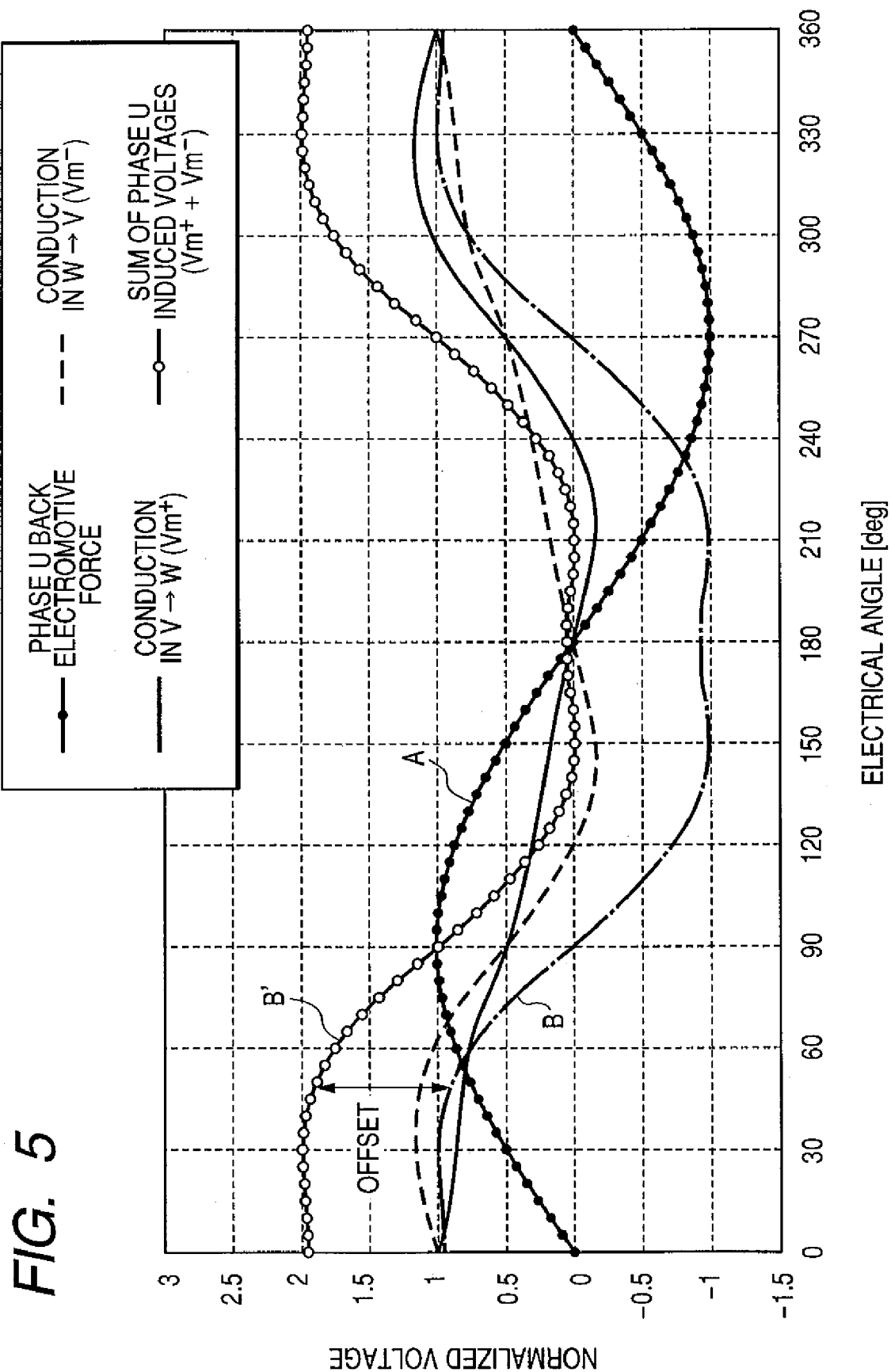
FIG. 5 is a waveform chart illustrating the phase relation between voltages induced in a non-conducting phase and back electromotive forces in a peculiar three-phase direct-current motor.
Figure 6:
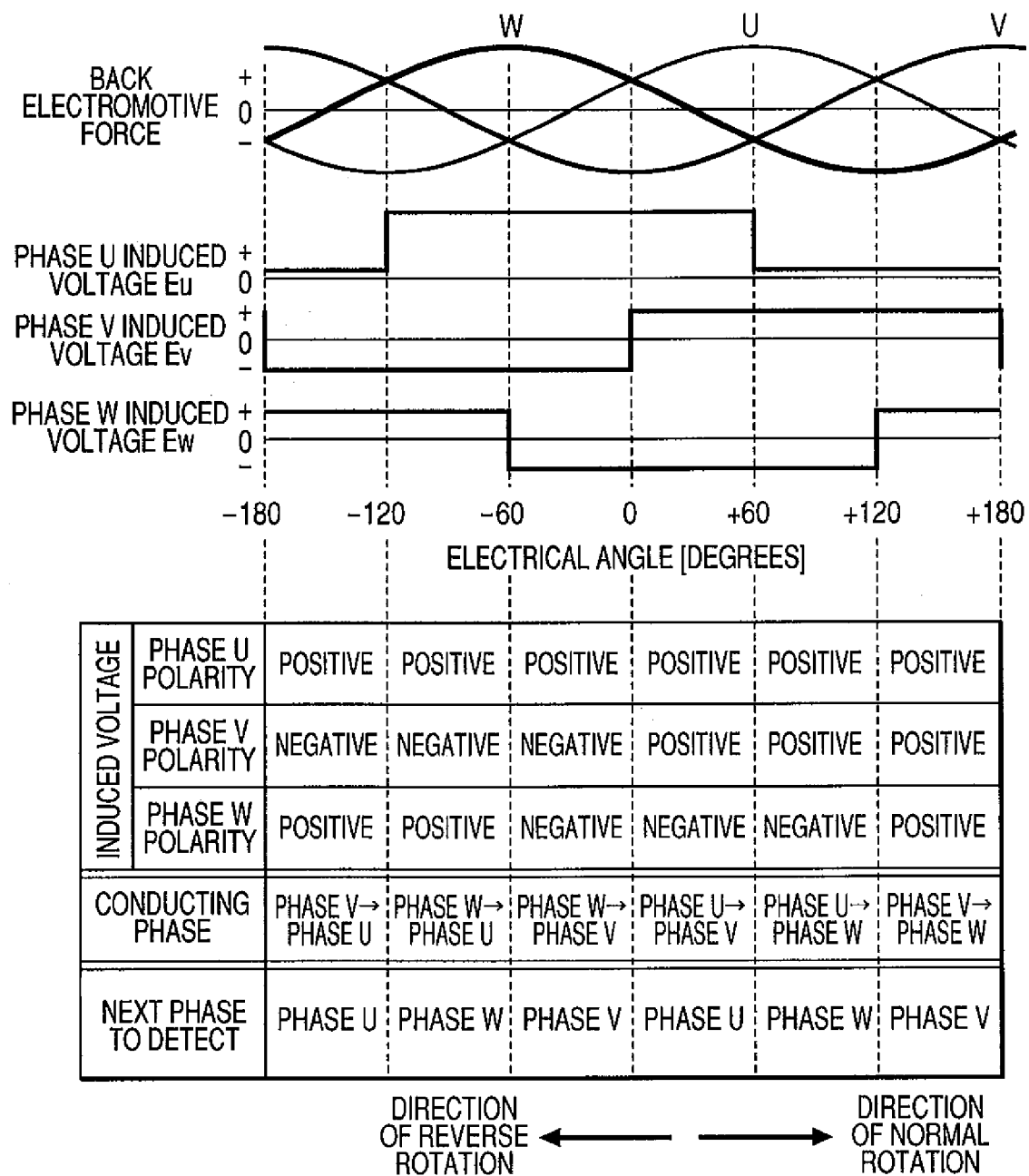
FIG. 6 is a waveform chart illustrating the phase relation between the polarities of induced voltages and back electromotive forces in a peculiar three-phase direct-current motor.

Recently, various three-phase direct-current motors have come on the market to reduce noise and vibration. It was found that some of these motors had an offset like the characteristic line B' obtained by plotting hollow circles, shown in FIG. 5, depending on the method of rotor magnet magnetization, the shape of core, or the like. Further, it was found that such motors did not switch the polarity of induced voltage to negative (or positive). The table shown at the lower part of FIG. 6 illustrates the polarities of the induced voltages of the coils in respective phases of a motor having such a characteristic. Unlike in the table shown in FIG. 4, all the cells for polarity in phase U indicate "positive" in the table in FIG. 6. It can be seen that, in some cases, a motor cannot be rotated in a proper direction with the method of start-up disclosed in Japanese Unexamined Patent Publication No. 2001-275387 in which a conducting phase and an energizing direction are determined based on the result of determination of polarity, positive or negative.

The start-up control in this embodiment is so constructed that the following is implemented: the average value of detected induced voltages is worked out, and the average value is compared with the detected induced voltages to determine relative polarities; and a conducting phase and an energizing direction are determined from the result of the determination. Thus, even a motor whose induced voltage has such a characteristic (offset) as illustrated in FIG. 5 can be started up without fail. In FIG. 3 and FIG. 5, the normalized voltage represented on the vertical axis is a voltage obtained by converting the maximum value of an induced voltage into 1V and the minimum value into −1V. FIG. 5 illustrates a case where only the induced voltage in phase U has an offset. There are cases where an induced voltage in any other phase, or induced voltages in two phases of the three phases or in all the three phases have an offset. In these cases as well, the start-up control in this embodiment is effective.

Figure 7:
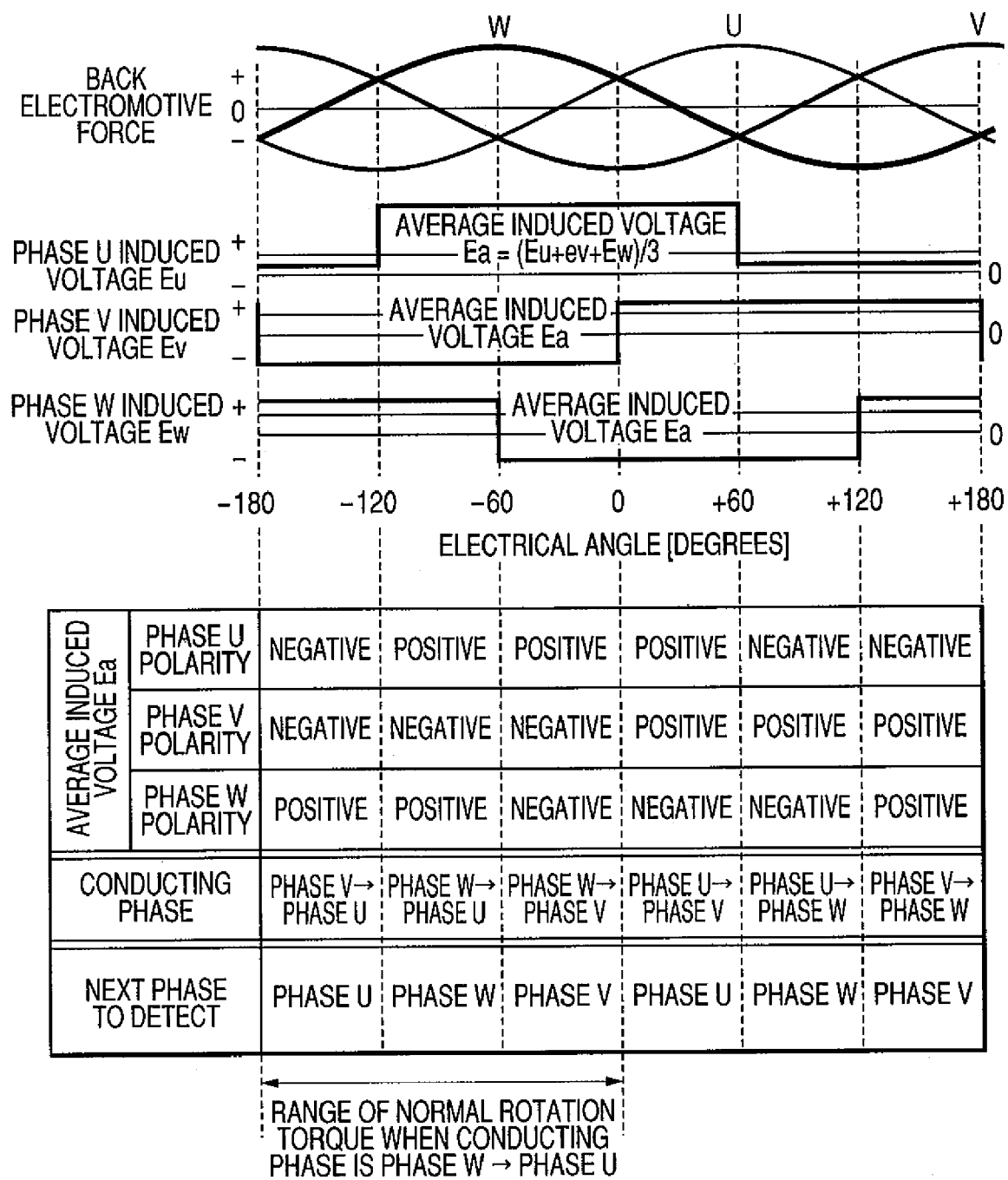
FIG. 7 is a waveform chart illustrating the phase relation between the polarities and the magnitude of levels of induced voltages and back electromotive forces in a peculiar three-phase direct-current motor.

FIG. 7 illustrates the following in a case where this embodiment is applied to the drive control circuit of a motor whose induced voltage has an offset: the relation between the phases of back electromotive forces and the timing of change in induced voltages; and the relation between the result of determination of the relative polarities of induced voltages, conducting phases, and the phases in which the next detection is to be carried out. As is apparent from the waveform in FIG. 7, the absolute polarity of induced voltage in phase U is constantly "positive." As illustrated in the table at the lower part of FIG. 7, the relative polarity is "negative" between electrical angles of −180° and −120° and between electrical angles of +60° and +180°. The comparison of the table at the lower part of FIG. 7 and the table shown in FIG. 4 reveals the following: both are identical with each other, and a conducting phase can be properly determined by applying this embodiment even if the polarity of induced voltage is not inverted between positive and negative.

Figure 8:
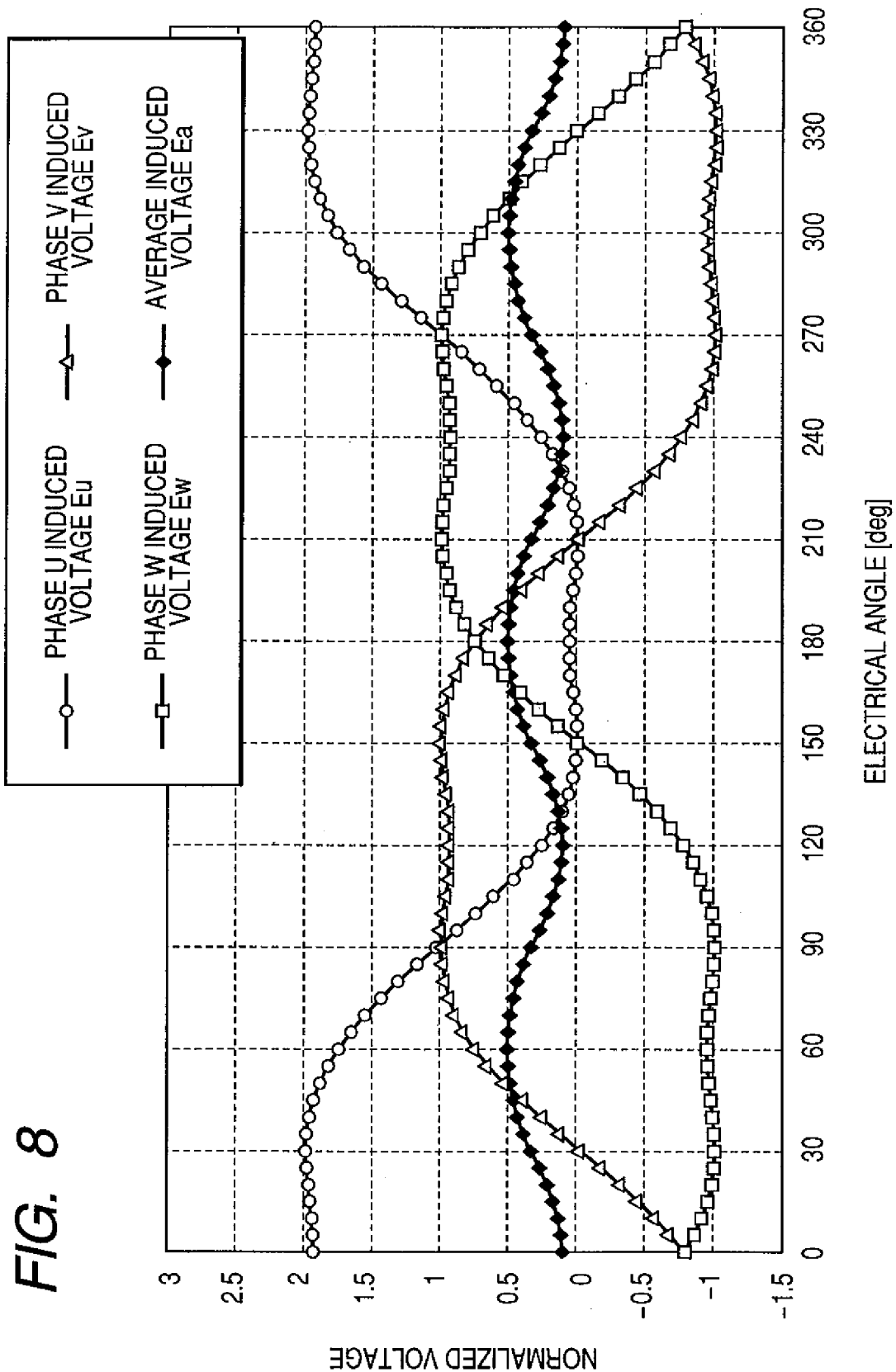
FIG. 8 is a waveform chart illustrating the relation between induced voltages and the average value of induced voltages in three phases in such a three-phase direct-current motor that the induced voltage in any phase has an offset.
Figure 9:
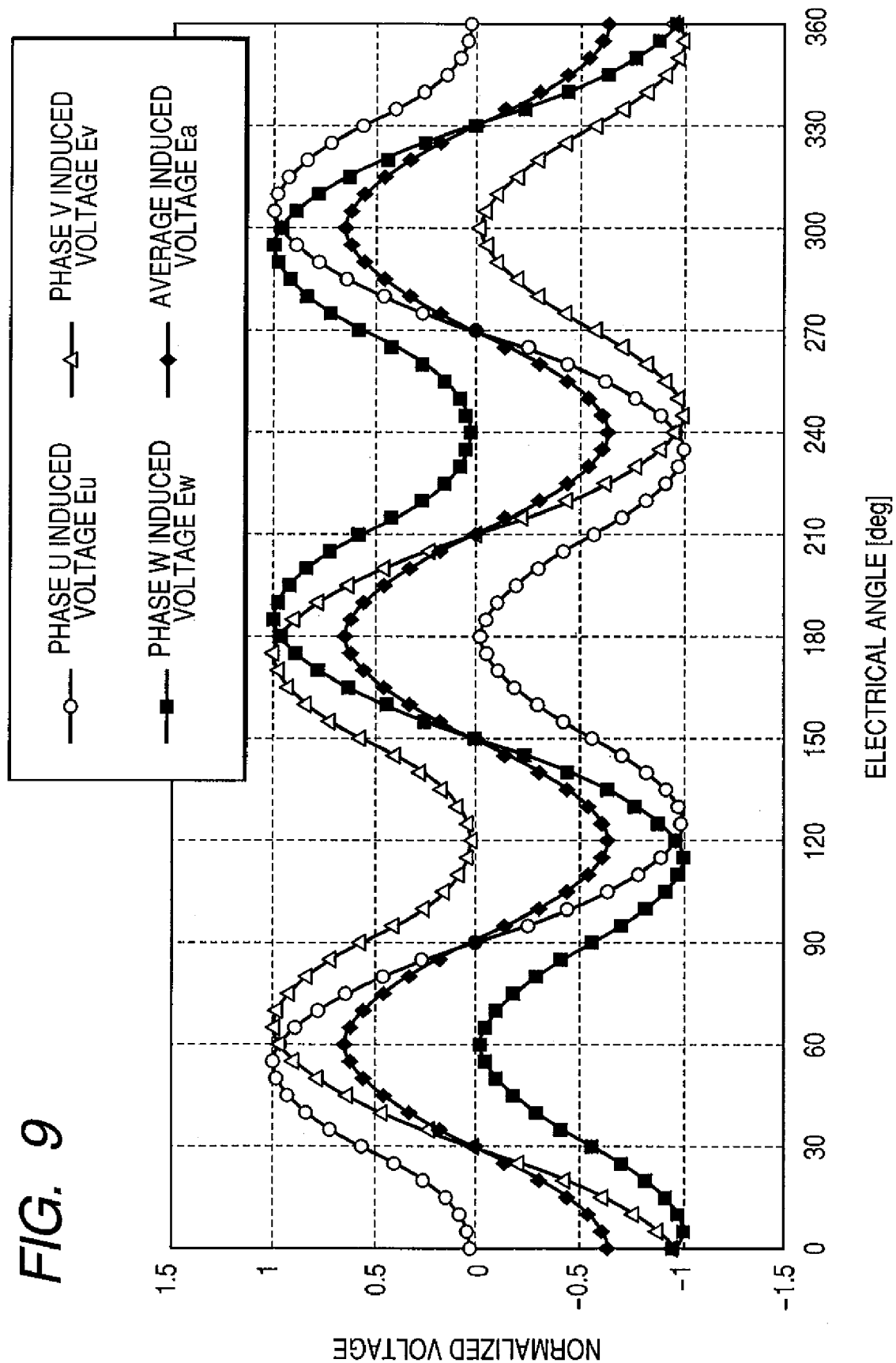
FIG. 9 is a waveform chart illustrating the relation between induced voltages and the average value of induced voltages in three phases in such a three-phase direct-current motor that variation in induced voltage contains dents.

FIG. 8 indicates the relation between change in induced voltages in phases U, V, and W and values (solid diamonds) obtained by averaging them in a motor in which the induced voltage in any phase (e.g., phase U) has an offset. FIG. 9 indicates the relation between change in induced voltages in phases U, V, and W and values (solid diamonds) obtained by averaging them in a motor in which induced voltages contain dents and on which Japanese Unexamined Patent Publication No. 2004-140975 focuses attention. The waveforms in FIG. 8 and FIG. 9 reveal the following: all the curves obtained by plotting induced voltages of coils in respective phases cross a line indicating the average value of the induced voltages of the coils in all the phases without exception; therefore, the following advantage is brought by comparing the average value of the induced voltages of coils in respective phases with detected induced voltages, and thereby identifying relative polarities to determine a conducting phase at start-up: even a motor of such a peculiar type that the polarity of an induced voltage does not switch every 180° of electrical angle or the polarity, positive or negative, does not occur with accuracy can be reliably started up without causing a reverse rotation.

The drive control circuit in this embodiment is so constructed that the above-mentioned identification of the relative polarities of induced voltages and determination of a conducting phase based on the result of the determination are carried out by the polarity detection unit 140, decoder 150, and sequencer 160. Hereafter, description will be given to the configuration and operation of the polarity detection unit 140 and the output current control unit 120 with reference to FIG. 10 and FIG. 11. Description will also be given to a start-up control procedure using the sequencer 160 with reference to the flowchart in FIG. 12.

Figure 10:
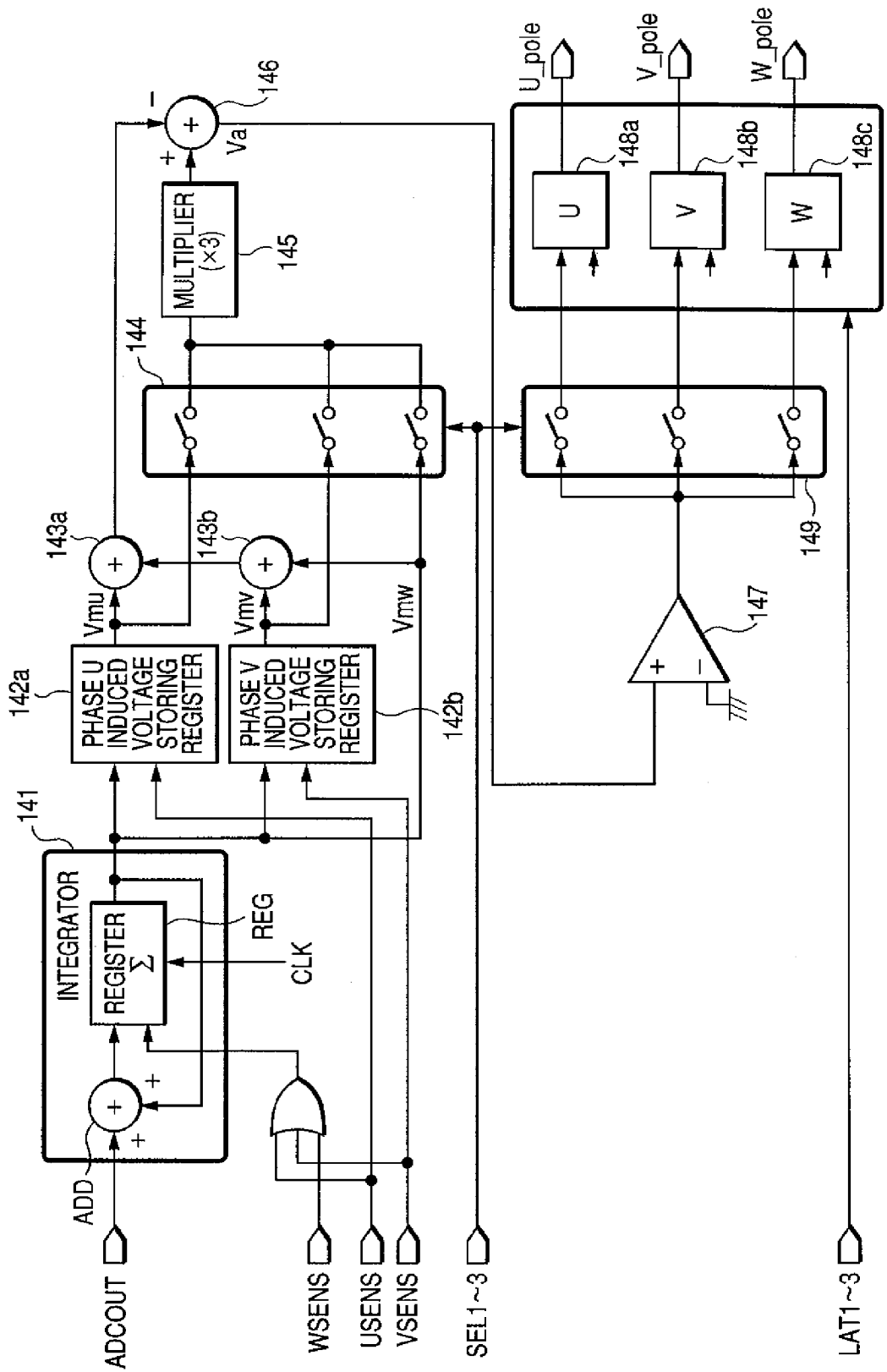
FIG. 10 is a block diagram illustrating an example of the configuration of the polarity detection unit of a motor drive control circuit in an embodiment.

FIG. 10 illustrates an example of the configuration of the polarity detection unit 140. The polarity detection unit 140 in this embodiment comprises: an integrator 141 that cumulatively adds induced voltage values detected by the induced voltage detection unit 130 and digitalized by the A-D converter 134; registers 142a and 142b that store voltages in two phases (e.g., phase U and phase V) of detected induced voltages; an adder 143b that adds together a value stored in the register 142b and an induced voltage (phase W) detected at the integrator 141; an adder 143a that adds together a value stored in the register 142a and a value computed by the adder 143b; a selector 144 that selects any one from among the values stored in the registers 142a and 142b and an induced voltage detected at the integrator 141; a multiplier 145 that triples the selected value; and a subtracter 146 that computes the difference between the result of computation by the multiplier 145 and the result of computation by the adder 143a.

In addition, the polarity detection unit 140 comprises: a comparator 147 for polarity determination that compares the output value of the subtracter 146 with a reference value (ground potential) and thereby determine a relative polarity; polarity registers 148a/148b, and 148c that respectively store the results of determination by the comparator 147; and a selector 149 that allows the results of determination by the comparator 147 to be transmitted to the corresponding polarity registers 148a, 148b, and 148c and stored there. Each of the selectors 144 and 149 is so constructed that any one correcting switch is turned on according to a selection signal SEL1, SEL2, or SEL3, and the two remaining switches are kept off.

The registers 142a and 142b respectively take in signals USENS and VSENS indicating the detection timing for phase U and phase V, supplied from the sequencer 160, and hold them. The integrator 141 comprises an adder ADD and a register REG. A value in the register REG is fed back to the adder ADD, and is added to an input value in synchronization with clock CLK. The integrator thereby carries out cumulative addition. In synchronization with signals USENS, VSENS, and WSENS indicating the detection timing for phase U, phase V, and phase W, respectively, the register REG holds the cumulative value at that time for a predetermined time. The polarity registers 148a, 148b, and 148c perform latch operation according to signals LAT1 to LAT3 indicating latch timing supplied from the sequencer 160.

The selector 149 is controlled according to selection signals SEL1 to SEL3 supplied from the sequencer 160. The results for phases determined by the comparator 147 are stored in the corresponding polarity registers 148a to 148c. They are outputted as signals Upole, Vpole, and Wpole indicating the polarities of induced voltages in respective phases from the polarity registers 148a to 148c to the decoder unit 150.

The decoder unit 150 decodes the signals Upole, Vpole, and Wpole indicating polarities from the polarity detection unit 140. Then it generates signals UPON, UNON, VPON, VNON, WPON, and WNON for driving and controlling the coils in respective phases in accordance with the energizing directions shown on the second line from bottom in the table in FIG. 7, and outputs them. At the same time, the decoder unit generates a selection signal SEL0 that informs the sequencer 160 of the determined conducting phase, and outputs it to the sequencer. Thus, not only a motor of such a peculiar type that the polarity of induced voltage does not switch every 180° of electrical angle or the polarity, positive or negative, does not occur with accuracy can be properly started up. But also a common motor in which the polarity switches between positive and negative can be properly started up.

The signals UPON, VPON, WPON, UNON, VNON, and WNON outputted from the decoder unit 150 mean the following: when the signals UPON, VPON, and WPON are at high level, voltage Vspn is applied to the coil terminal in the corresponding phase to cause a current to flow in; when the signals UNON, VNON, and WNON are at high level, the coil terminal in the corresponding phase is connected to a ground point to pull in a current; when both the signals UPON, VPON, and WPON and the signals UNON, VNON, and WNON are at low level, the coil terminal in the corresponding phase is set to a high impedance, that is, it is brought into a non-conducting phase.

Figure 11:
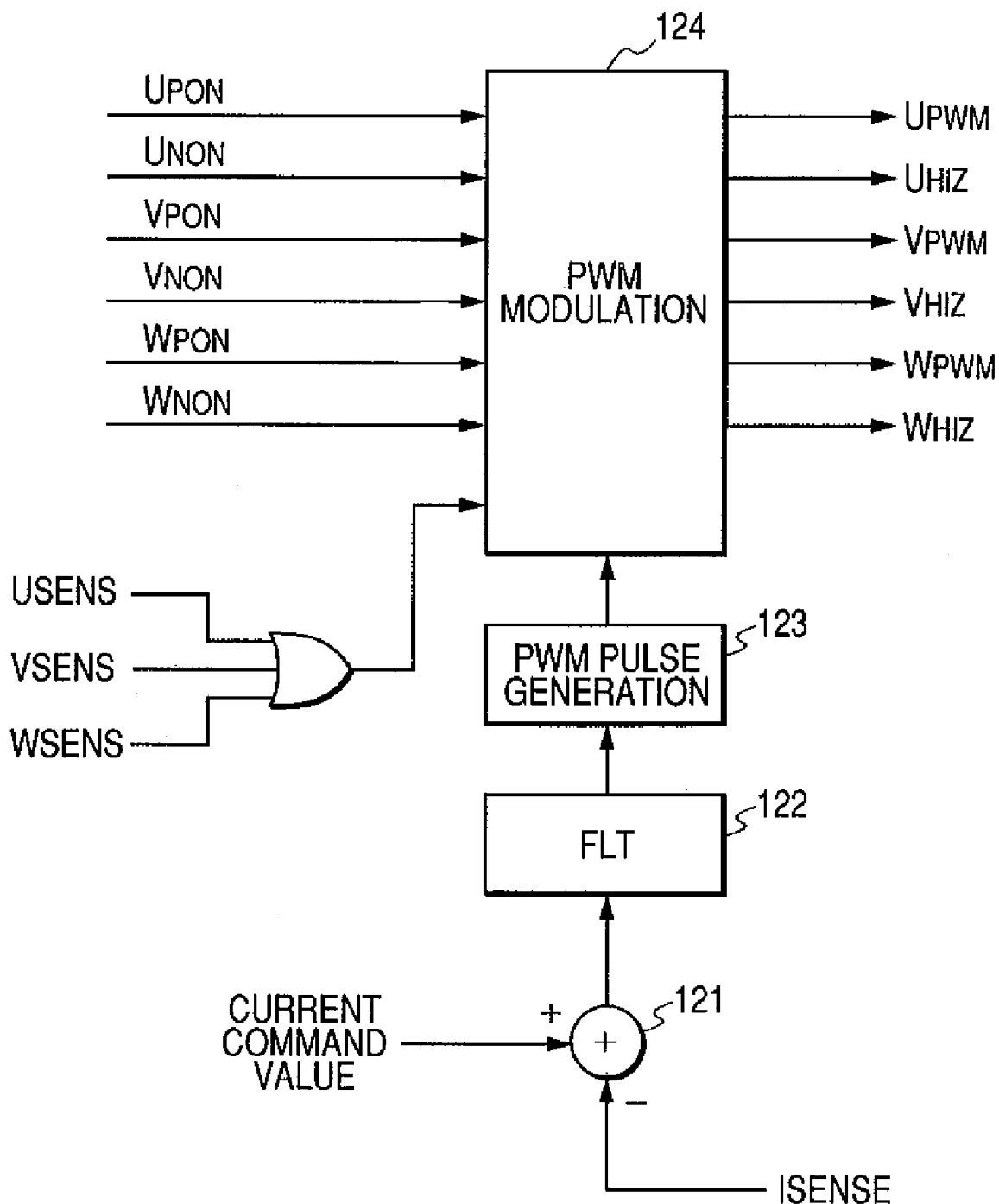
FIG. 11 is a block diagram illustrating an example of the configuration of the output current control unit of a motor drive control circuit in an embodiment.

As illustrated in FIG. 11, the output current control unit 120 comprises: a subtracter 121 that computes the difference between ISENSE obtained by converting a voltage in proportion to a coil current detected by the sense resistor Rsns during steady-state rotation control into a digital value at the A-D converter 134 and a current command value supplied from a controller, not shown; a filter 122 for preventing oscillation in a current control system; a pulse generation circuit 123 that generates a PWM pulse of a predetermined frequency having a pulse width corresponding to the output voltage of the filter 122; a PWM modulation circuit 124; and the like. The PWM modulation circuit generates and outputs the following signals according to the energization control signals UPON and UNON; VPON and VNON; and WPON and WNON from the decoder unit 150 and the timing signals USENS, VSENS, and WSENS from the sequencer 160: a PWM driving signal UPWM for a phase U pre-driver 111 or a signal UHIZ giving an instruction to set the phase U terminal to a high impedance; a PWM driving signal VPWM for a phase V pre-driver 112 or a signal VHIZ giving an instruction to set the phase V terminal to a high impedance; and a PWM driving signal WPWM for a phase W pre-driver 113 or a signal WHIZ giving an instruction to set the phase W terminal to a high impedance.

When a motor is started up, the output current control unit 120 generates the following signals and supplies them to the pre-drivers 111, 112, and 113 according to a signal from the PWM modulation circuit 124: a driving signal for carrying out energization for induced voltage detection for a predetermined time and a PWM modulating signal obtained by carrying out such PWM drive control that a current passed through the sense resistor Rsns is matched with a current command value from the controller. These signals are alternately switched from the USENS, VSENS, and WSENS signals. The output current control unit is so constructed that the following is implemented: when the number of motor rotations reaches a predetermined value, the acceleration of the motor by induced voltage detection is terminated; only such PWM drive control mentioned above that the current passed through the sense resistor Rsns is matched with a current command value from the controller is thereby carried out. The A-D converter 134 is used in common to convert a voltage detected by the induced voltage detection unit 130 and a coil current detected by the sense resistor Rsns into digital signals.

Figure 12:
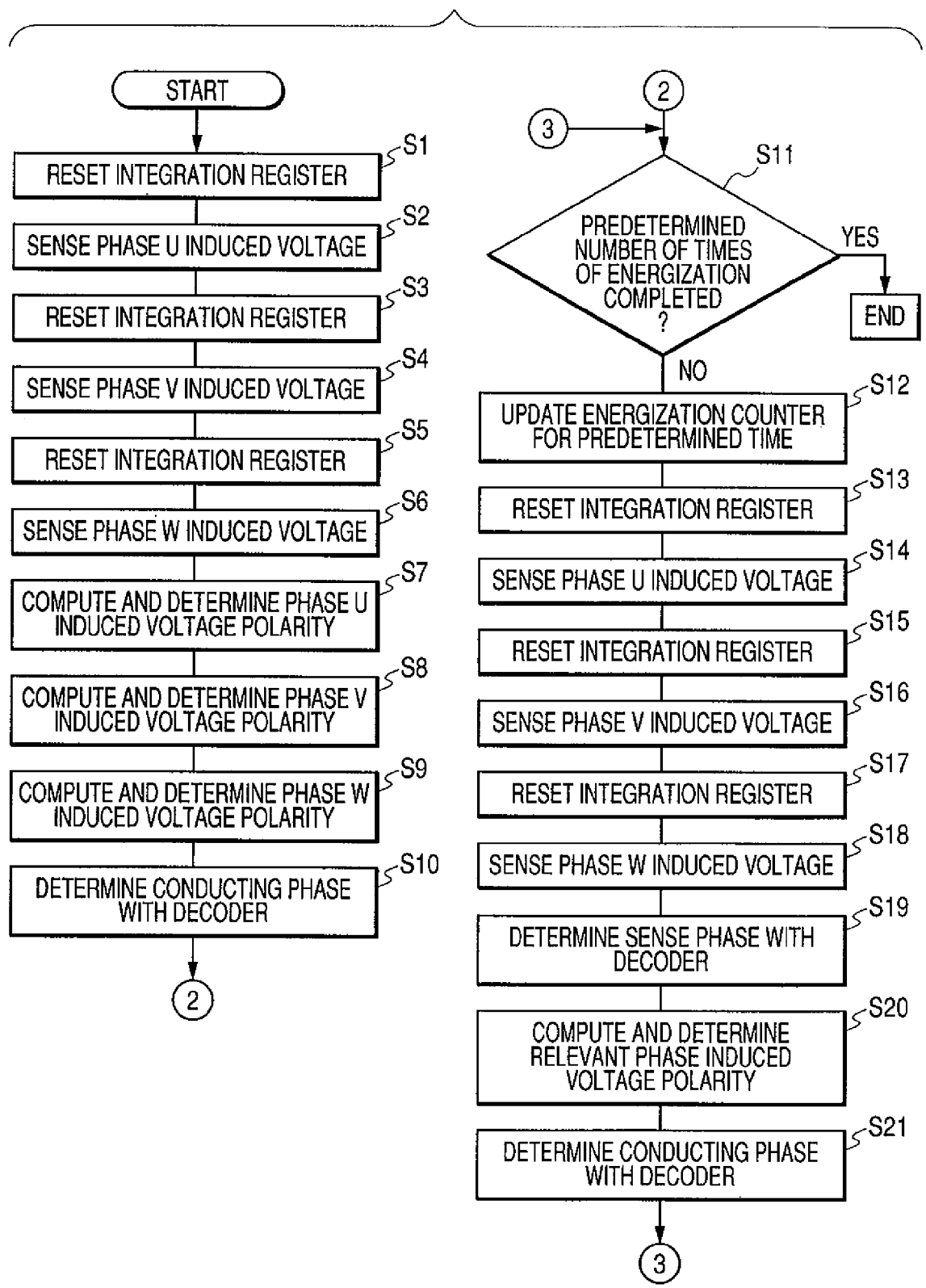
FIG. 12 is a flowchart illustrating an example of a start-up control procedure using a sequencer in a motor drive control circuit in an embodiment.
Figure 13:
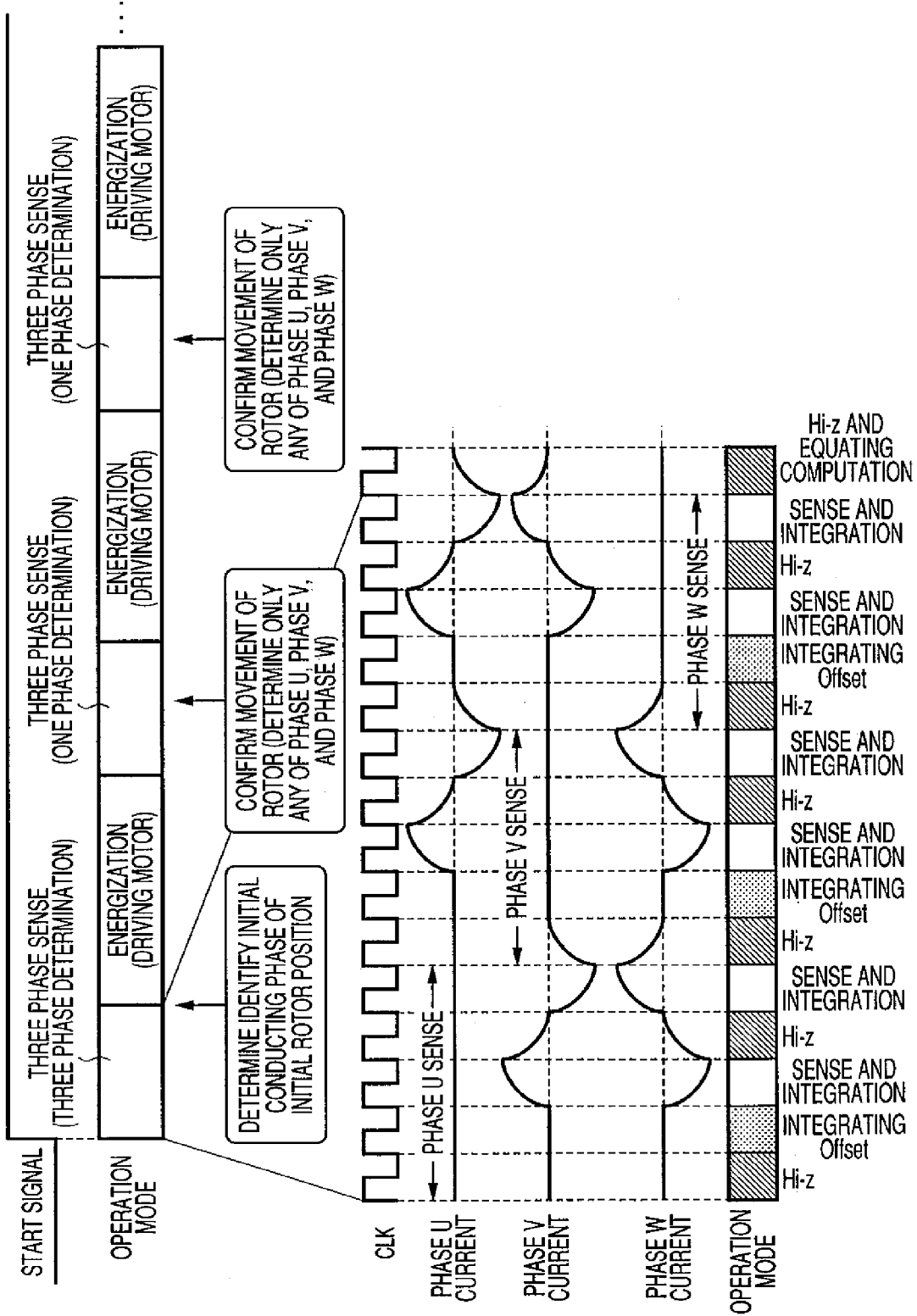
FIG. 13 is a time diagram illustrating the operation timing for start-up control in a motor drive control circuit in an embodiment.

Description will be given to the start-up control procedure using the sequencer 160 with respect to the flowchart in FIG. 12. FIG. 13 is a timing diagram of this start-up control.

When start-up control is started, the sequencer 160 resets the register REG of the integrator 141 for cumulatively holding the results of A-D conversion, provided in the polarity detection unit 140 illustrated in FIG. 10 (Step S1). Thereafter, a current of such a short pulse that the rotor does not react is caused to flow from the coil in phase V to the coil in phase W. The induced voltage that occurs in the coil in "phase U" due to the phenomenon of mutual induction at that time is detected by a predetermined number of times. The results obtained by converting the detected induced voltages through the A-D converter circuit 134 are cumulated in the integration register 141. The direction of the current is inverted, and the same operation is repeated. The polarity and level of the induced voltage in phase U are determined based on the values in the integration register, and the result of the determination is latched into the register 142*a* (Step S2).

The register of the integrator 141 is reset again, and then a current of such a short pulse that the rotor does not react is caused to flow from the coil in phase U to the coil in phase W. This time, the induced voltage that occurs in the coil in "phase V" is detected by a predetermined number of times. The results obtained by converting the detected induced voltages through the A-D converter circuit 134 are cumulated in the register of the integrator 141. The direction of the current is inverted, and the same operation is repeated. The polarity and level of the induced voltage in phase V are determined based on the values in the integration register, and the result of the determination is latched into the register 142*b* (Steps S3 and S4.)

Thereafter, the register of the integrator 141 is reset once again, and then a current of such a short pulse that a rotor does not react is caused to flow from the coil in phase U to the coil in phase V. This time, the induced voltage that occurs in the coil in "phase W" is detected by a predetermined number of times. The results obtained by converting the detected induced voltages through the A-D converter circuit 134 are cumulated in the register of the integrator 141. The direction of the current is inverted, and the same operation is repeated. The polarity and level of the induced voltage in phase W are determined based on the values in the integration register (Steps S5 and S6), and the result of the determination is held in the register REG of the integrator 141.

Subsequently, the selector 144 is controlled to transmit the values in the registers 142*a*, 142*b*, and REG to the multiplier 145 one by one. Each detection value is tripled there, and the result obtained by adding the values in the registers REG, 142*b*, and 142*a* at the adders 143*a* and 143*b* is subtracted from it. The subtraction value is compared with the reference value at the comparator 147 to determine the relative polarity of induced voltage in each phase. Further, the selector 149 is controlled to latch the results of polarity determination into the corresponding registers 148*a*/148*b*, and 148*c* (Steps S7 to S9). Thereafter, these results of polarity determination are transmitted to the decoder unit 150 to determine a conducting phase (the direction of energization) (Step S10).

Subsequently, the operation proceeds to Step S11, and the value on a counter is referred to determine whether a predetermined number of times of energization of the coils have been completed or not. If they have not been completed yet, energization is carried out in the conducting phase determined at Step S10 for a predetermined relatively short time, and the energization counter is incremented (Step S12). Then, the integration register REG is reset (Step S13), and a current of such a short pulse that the rotor does not react is passed between the coil in phase v and the coil in phase W. The induced voltage that occurs in the coil in "phase U" due to the phenomenon of mutual induction at that time is detected (Step S14). Similarly, the integration register REG is reset, and then a current is passed between the coil in phase W and the coil in phase U. The induced voltage that occurs in the coil in "phase V" due to the phenomenon of mutual induction at that time is detected; and a current is passed between the coil in phase U and the coil in phase V, and the induced voltage that occurs in the coil in "phase W" due to the phenomenon of mutual induction at that time is detected (Steps S15 to S18). At this time, the sequencer 160 generates a selection signal SEL1, SEL2, or SEL3 corresponding a signal SEL0 indicating the sense phase in which the induced voltage should be detected next, based on the signal SEL0, and outputs it. The signal SEL0 is supplied from the decoder unit 150 based on the result of polarity determination.

Based on the results of detection at Steps S2 to S6, a phase in which the polarity should be determined at the decoder unit 150. The selector 144 is controlled in accordance with this determination, and with respect to the determined phase, computation is carried out by the computing units 143*a*, 143*b*, 145, and 146 shown in FIG. 10. Using the result of the computation, it is determined at the comparator 147 whether the relative polarity of the induced voltage in that phase is positive or negative (Steps S19 and S20). The reason why the polarity is determined with respect to only one phase is as follows: as is apparent from the table at the lower part of FIG. 7, once energization is carried out in a determined phase, the phase in which the polarity changes next is uniquely determined. Therefore, unlike before the start of energization, a conducting phase can be determined only by polarity computation and determination in one phase after energization is carried out.

Based on the result of determination at Step S20, the phase and direction in which energization should be carried out next are determined at the decoder unit 150 (Step S21). Then the operation returns to Step S11, and the above-mentioned procedure is repeated. Thus, the rotational speed of the rotor is gradually increased. If it is determined at Step S11 that a predetermined number of times of energization have been completed, the start-up control process is terminated, and the operation transitions to feedback control based on a current command value from the controller.

If the result of determination of the polarity of induced voltage carried out at Step S20 is the same as the previous result, the same phase (e.g., phase U) as the previous time is selected as sense phase at Step S21. Then, energization is carried out in the same phase (e.g., phase U→phase V). If the result of determination carried out at Step S20 differs from that at the previous time, the phase (e.g., phase W) expected next is selected as sense phase at Step S19, and energization is carried out in the corresponding phase (e.g., phase U→phase W) at Step S21. Thus, once energization is started, a conducting phase is determined only by polarity determination in one phase. This brings the following advantages: the time required for determining a conducting phase can be shortened as compared with cases where polarity determination is carried out with respect to all the three phases, and the conducting phase can be changed in the direction of normal direction without fail.

Figure 14:
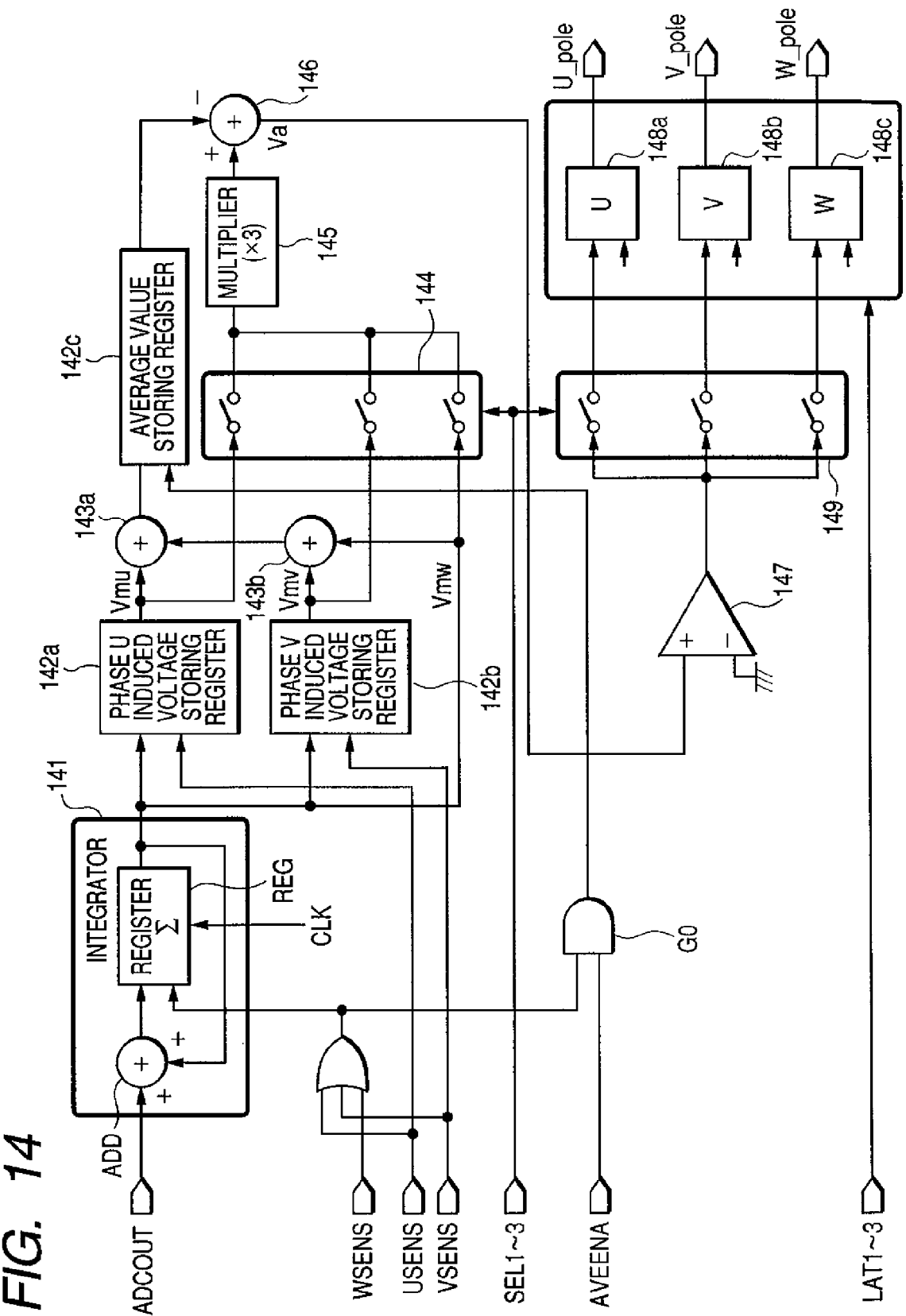
FIG. 14 is a block diagram illustrating an example of the configuration of the polarity detection unit of a motor drive control circuit in a second embodiment.
Figure 15:
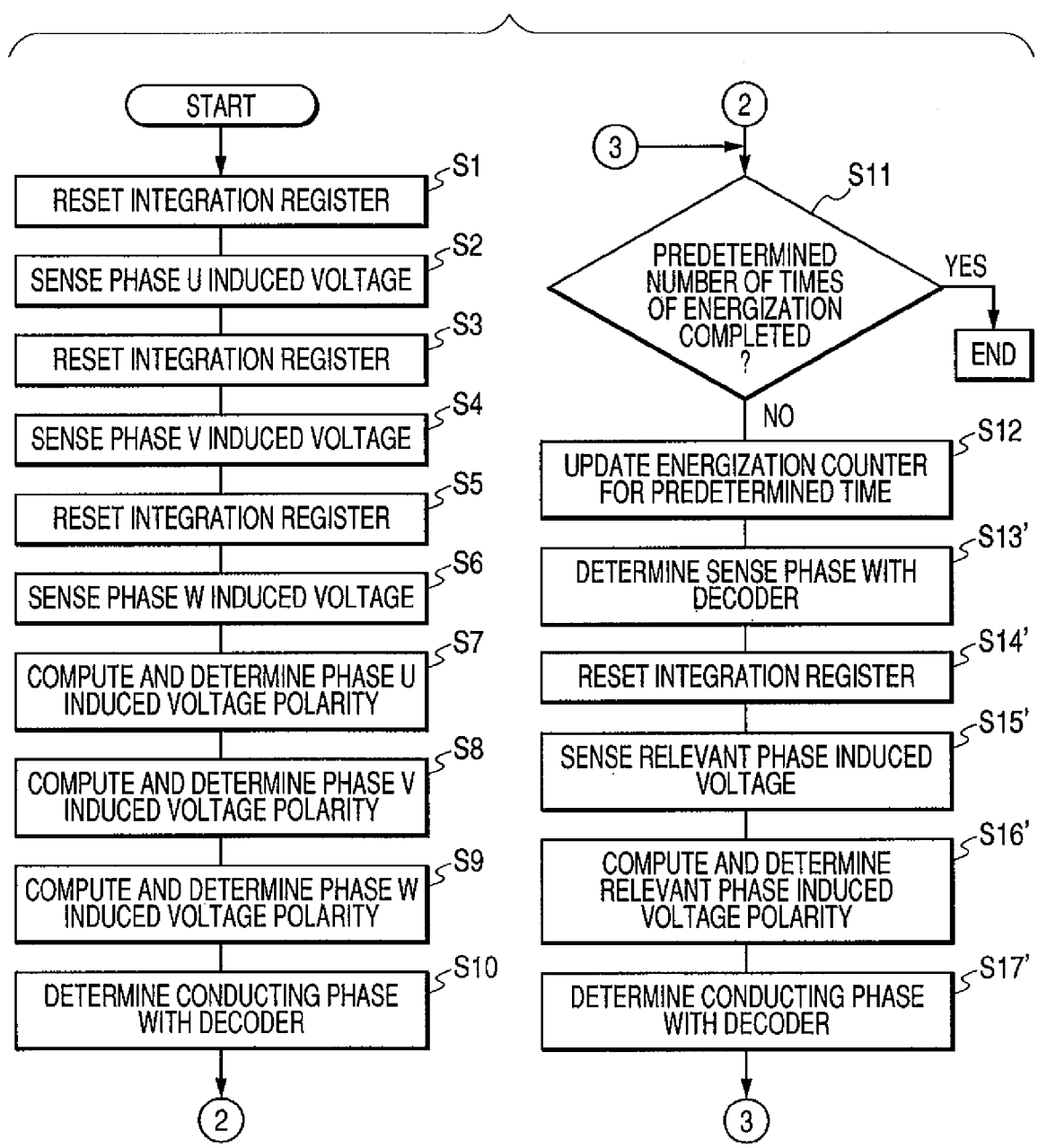
FIG. 15 is a flowchart illustrating an example of a start-up control procedure using a sequencer in a motor drive control circuit in a second embodiment.

FIG. 14 and FIG. 15 illustrate another example of a motor drive control circuit according to the present invention.

The drive control circuit in this embodiment is substantially the same as the drive control circuit in the first embodiment. One difference from the first embodiment is as follows: a register 142c and an AND gate G0 are provided in the stage subsequent to the registers 142a and 142b that store induced voltages detected at the polarity detection unit 140, illustrated in FIG. 10. The register 142c stores values obtained by adding together all the induced voltages detected with respect to coils in three phases, that is, a value equivalent to the average value of induced voltages in three phases. The AND gate generates a signal providing the latch timing therefor. Another difference is as follows: the start-up control on a motor is simplified in correspondence with the foregoing.

More specific description will be given. Provision of the register 142c that stores the value equivalent to the average value of induced voltages in three phases makes unnecessary the detection of induced voltages in three phases at Steps S13 to S18 in the control flowchart in FIG. 12. Thus, the induced voltage only in one phase is detected and polarity determination is carried out based thereon. For this reason, the control flow in this embodiment is implemented as illustrated in FIG. 15. That is, after energization at Step S12, a phase in which polarity determination should be carried out is determined at the decoder unit 150 based on the results of detection at Steps S2 to S6 (Step S13'). Induced voltage is detected with respect only to the determined phase (Steps S14' and S15'), and polarity determination is carried out based on this detection to determine a conducting phase (Steps S16' and S17').

In this embodiment, as mentioned above, the induced voltage in one phase only has to be detected to determine a conducting phase, and the following advantage is brought: the time required to start up a motor is shortened as compared with cases where the first embodiment is applied. The second embodiment is effectively applicable to start-up control on a motor of such a type that the average value of induced voltages does not vary so much as illustrated in FIG. 8. The reason for this is as follows: when this embodiment is applied to start-up control on a motor of such a type that the average value of induced voltages greatly varies as illustrated in FIG. 9, the average value is varied according to a difference in the position of the rotor in a stop. This makes it difficult to determine a polarity with accuracy.

Up to this point, specific description has been given to the invention made by the present inventors based on embodiments thereof. However, the present invention is not limited to the above-mentioned embodiments, and various medications can be made without departing from the spirit thereof, needless to add. Some examples will be taken. In the description of the motor drive control circuit in the above embodiments, a circuit that drives and controls a three-phase direct-current motor is taken as an example. The present invention is applicable to a polyphase direct-current motor other than three-phase motors.

With respect to the embodiments, description has been given to start-up control on a motor of such a peculiar type that the polarity of induced voltage does not switch every 180° of electrical angle or the polarity, positive or negative, does not occur with accuracy. The start-up control circuit in the above embodiments is also applicable to start-up control on a common motor in which the polarity of induced voltage switches every 180° of electrical angle.

In the above embodiments, instead of working out the average value of induced voltages in three phases, values obtained by tripling the total of values in three phases and the detection value in any phase at the multiplier are used to determine a relative polarity. Instead of a multiplier, a divider that works out the average value of induced voltages in three phases may be used. The above embodiments are provided with two adders 143a and 143b that add together induced voltages in respective phases to determine the value equivalent to the average value of induced voltages in three phases. For example, the construction in FIG. 14 may be modified as follows: a selector is provided on the input side of the adder 143a so that the input value can be switched; and a path for returning the value in the register 142c to the adder 143a is provided and the adder 143b is thereby omitted.

The above description has been given mainly to cases where the invention made by the present inventors is applied to the drive control device of a spindle motor for hard disk unit that is the field of utilization underlying the invention. The present invention is not limited to this field, but it can be utilized in a wide range of motor drive control devices for driving brushless motors, including, for example, a motor that rotates the polygon mirror of a laser beam printer and an axial flow fan motor.

What is claimed is:

1. A drive control device of a poly-phase direct current motor, comprising:
   an induced voltage detecting unit that detects an induced voltage of coils of a stator of the poly-phase direct current motor wherein when such a current that a rotor of the poly-phase direct current motor does not react is passed through any two phase coils of the poly-phase direct current motor in succession, the induced voltage detecting unit detects the voltage induced in a non-conducting phase; and
   a polarity detection unit that determines a polarity of the induced voltage detected by the induced voltage detection unit and that determines the average value of the induced voltages in the non-conducting phases,
   wherein a value equivalent to an average value of induced voltages in all phases of the poly-phase direct current motor is determined and a polarity of induced voltage in each phase of the poly-phase direct current motor is determined by comparison of the detected induced voltages of the respective phases with the value equivalent to the average value, and
   wherein a phase coil of the poly-phase direct current motor through which a current should be passed to rotate the rotor and the direction of energization are determined based on results of the detection of induced voltages and the determined polarity in respective phases of the poly-phase direct current motor for rotating and starting-up of the rotor of the poly-phase direct current motor.

2. The drive control device of a poly-phase direct current motor according to claim 1, further comprising:
   a three phase direct current motor as said poly-phase direct current motor having first, second and third phase coils;
   a first holding circuit that holds a detection value of the induced voltage occurring in the coil of the third phase as the non-conducting phase when said current is passed through the coils of the first phase and second phase;
   a second holding circuit that holds a detection value of induced voltage occurring in the coil of the second phase as the non-conducting phase when said current is passed through the coils of the first phase and third phase; and a third holding circuit that holds a detection value of induced voltage that occurs in the coil of the first phase as the non-conducting phase when said current is passed through the coils in the second phase and the third phase, wherein the polarity detection unit determines the average value of induced voltages in the non-conducting phases from the induced voltages held in the first, second and third holding circuits that is used by a polarity determination circuit in determining a plurality of induced voltages in each phase of the three phase direct current motor.

3. The drive control device of motor according to claim 2, wherein a current having such an amplitude and a duration that the rotor reacts is passed in accordance with the phase coil of the three-phase direct-current motor and the direction of energization determined based on results of determination by the polarity determination circuit, thereafter the induced voltages in all three phases of the three-phase direct-current motor are detected again to determine again the value equivalent to the average value thereof, the polarity of induced voltage in any phase of the three-phase direct-current motor is determined from the value equivalent to the average value determined again and the induced voltage in a predetermined phase of the three-phase direct-current motor, and the phase coil of the three-phase direct-current motor through which a current should be passed and the direction of energization are thereby determined.

4. The drive control device of motor according to claim 2, comprising:

a fourth holding circuit that holds the value equivalent to the average value, wherein a current having such an amplitude and a duration that the rotor of the three-phase direct-current motor reacts is passed in accordance with the phase coil of the three-phase direct-current motor and the direction of energization determined based on result of determination by the polarity determination circuit, thereafter the induced voltage in a predetermined phase of the three-phase direct-current motor is detected, the polarity of induced voltage in any phase of the three-phase direct-current motor is determined from the detected induced voltage and the value equivalent to the average value held in the fourth holding circuit, and a phase coil of the three-phase direct-current motor through which a current should be passed and the direction of energization are thereby determined.

5. The drive control device of motor according to claim 2, wherein any one holding circuit of the first, second, and third holding circuits is provided in an accumulation circuit that accumulates detection values of induced voltages that occur in non-conducting phase when a current is passed through the two phase coils other than in non-conducting phase of the three-phase direct-current motor by a preset number of times, and is used to hold cumulative values when the induced voltages in all phases of the three-phase direct-current motor are detected.

* * * * *